May 5, 1964  S. KARBOWNICZEK  3,131,921
SHOCK ABSORBER
Filed March 13, 1963  2 Sheets-Sheet 1
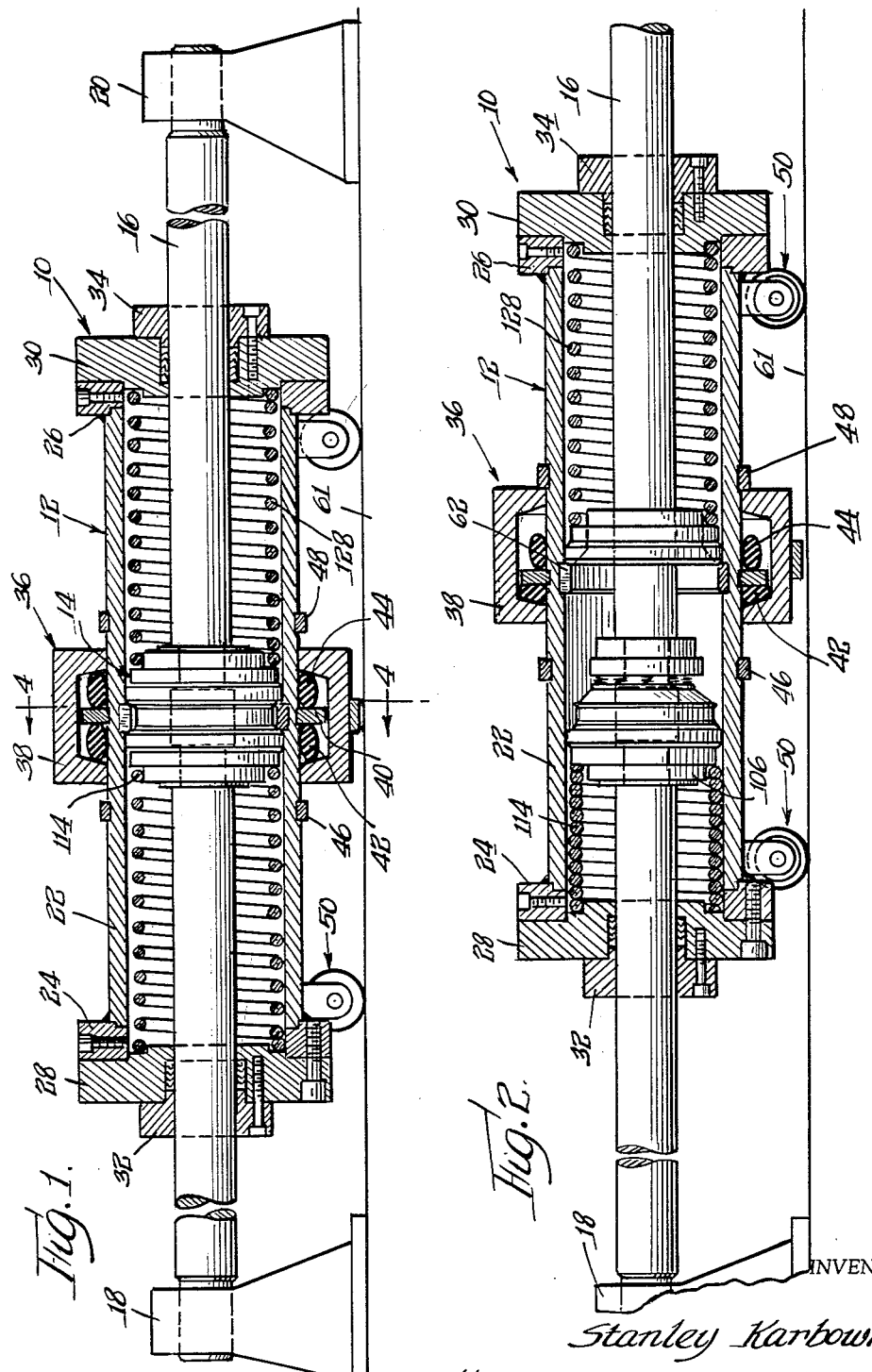
INVENTOR.
Stanley Karbowniczek
By: Stone, Nierman, Burmeister & Zummer
Attys.

May 5, 1964  S. KARBOWNICZEK  3,131,921
SHOCK ABSORBER
Filed March 13, 1963  2 Sheets-Sheet 2
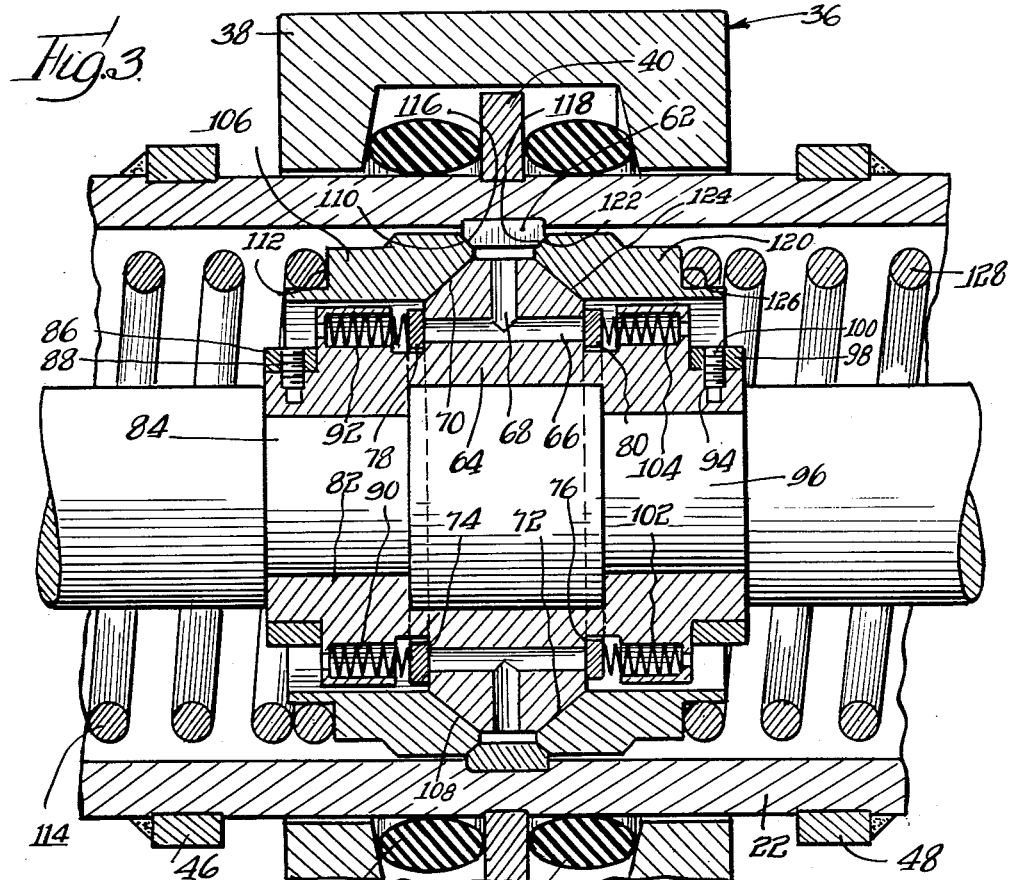
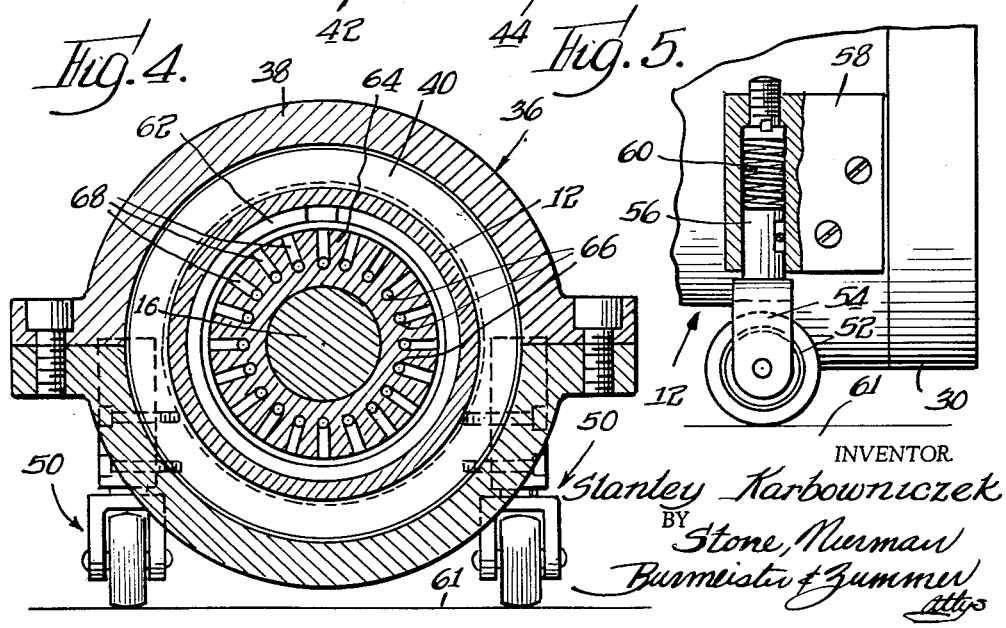
INVENTOR.
Stanley Karbowniczek
BY Stone, Newman
Burmeister & Zimmer
attys United States Patent Office 3,131,921
Patented May 5, 1964

3,131,921
SHOCK ABSORBER
Stanley Karbowniczek, Chicago, Ill., assignor to Ellis Fluid Dynamics Corp., Skokie, Ill., a corporation of Illinois
Filed Mar. 13, 1963, Ser. No. 264,933
11 Claims. (Cl. 267—1)

This invention relates to an improvement in shock absorbers and more specifically to improved construction for a split piston for use in a double acting shock absorber.

Double acting shock absorbers have achieved acceptance in a wide variety of usage. One of the peculiar problems to a double acting shock absorber is the construction of the piston used in the shock absorber. In the case where a double acting shock absorber uses a pair of balanced springs for its normal or null position, the null position has a tendency to vary as the springs are used inasmuch as one spring may achieve a permanent set greater than that of the other spring. It is desirable to provide a construction which has a fixed null position. In order to achieve this end, it is necessary to provide a piston capable of being split during the normal operation of the shock absorber, but still provide a good seal during the displacement of the piston and to provide a venting arrangement which allows the piston to return to its normal or null position with a minimum of time delay. It is, therefore, a principal object of the herein disclosed invention to provide an improved construction of a piston for use in a double acting shock absorber which allows the piston to be split, but still provides good fluid flow control by the piston when the piston is displaced from its normal or null position.

It is another object of the instant invention to provide an improved piston construction for use in a double acting shock absorber which piston is inexpensive to manufacture and has a high degree of reliability.

It is a further object of the present invention to provide an improved piston construction for use in a double acting shock absorber which piston construction uses conical sealing surfaces in mating engagement with other parts of the piston to provide improved sealing between the parts.

Other objects and uses of the instant invention will become readily apparent to those skilled in the art upon a perusal of the following specification in light of the accompanying drawings in which:

FIGURE 1 is a cross sectional view of a shock absorber embodying the herein disclosed invention shown in a null or normal position;

FIGURE 2 is a cross sectional view of the shock absorber shown in FIGURE 1 but in a displaced attitude;

FIGURE 3 is an enlarged cross sectional view of the piston and a portion of the shock absorber shown in FIGURE 1;

FIGURE 4 is a cross sectional view taken on line 4—4 in FIGURE 1; and

FIGURE 5 is an enlarged view of a supporting roller mounted on the shock absorber.

Referring now to the drawings and especially to FIGURE 1, a double acting shock absorber generally indicated by numeral 10 and embodying the herein disclosed invention is shown therein. The shock absorber 10 generally includes, a cylinder 12 having a piston 14 slidably mounted in the cylinder, a piston rod 16 connected to the piston and axially moveable in the cylinder, and opposite ends of piston rod 16 mounted on a pair of pedestals 18 and 20.

The cylinder 12 includes a tube 22 having a pair of opposite flanges 24 and 26 welded thereon. Attached to the flanges 24 and 26 are tube heads 28 and 30, respectively. The heads 28 and 30 have glands 32 and 34, respectively, mounted therein and those glands form a seal between the respective heads and the rod 16.

A cushion assembly 36 is mounted on the center of the tube 22. The cushion assembly includes a split load ring 38 which is slideable on the outer periphery of the tube. A tube load ring 40 is fixed to the outer periphery of the tube and is mounted within the split load ring 38. A pair of bumper rings 42 and 44, which are made of natural rubber, are mounted between the tube stop ring 40 and the interior surface of the split load ring 38. A pair of tube stop rings 46 and 48 are welded to the outer periphery of the tube 22 and are spaced from opposite ends of the split load ring 38. It may be seen in FIGURE 2 that when an axial load is applied to the load ring 38, one of the bumper rings is compressed and the load ring moves into engagement with a stop ring to apply a force to the tube 22.

The cylinder 12 has four identical wheel assemblies 50 mounted on the tube. Two of the wheel assemblies are mounted adjacent to one end of the tube while the other two are mounted adjacent to the other end as may be seen in FIGURES 1 and 2. Looking now to the FIGURE 5 it may be seen that each wheel assembly includes a wheel 52 rotatably mounted in a yoke 54. The yoke is attached to a wheel shaft 56 which is mounted in a wheel mount 58. Each wheel mount is fixed to the tube, and a spring 60 mounted in each mount resiliently urges the respective wheel downward into engagement with a supporting surface 61. The wheels mounted on the cylinder prevent any undesired rotation of the shock absorber during the normal operation of the shock absorber.

Referring now to FIGURE 3, which shows a cross sectional view of the piston 14, it may be seen that the piston is engageable with a stop ring 62 which is fixed on the interior surface of the tube 22. In this instance, the tube 22 is tapered and having its largest diameter at the center of the tube where the stop ring 62 is located, the diameter of the tube decreases toward the two heads 28 and 30.

The piston 14 includes a vent ring 64 which is mounted at the center of the rod 16. The vent ring has a plurality of axial vent apertures 66 which extend along the length of the vent ring. Opening into each of the vent apertures is a radial drain aperture 68. These drain apertures 68 open into the outer periphery of the vent ring 64. The vent ring has a pair of identical outer peripheral conical surfaces 70 and 72 which conical surfaces extend in opposite directions. The vent ring also has a pair of finished valve surfaces 74 and 76. The valve surfaces have the apertures 66 extending therethrough. The flow of fluid through the vent apertures 66 is controlled by a pair of ring valves 78 and 80 which sealingly engage the valve surfaces 74 and 76, respectively.

A split vent ring lock 82 is mounted in a reduced proportion 84 of the rod 16. The vent ring lock is in engagement with the vent ring 64 to hold the vent ring in one direction. A vent ring lock collar 86 holds the vent ring lock together and a set screw 88 holds the collar 86 in position on the vent ring lock. The vent ring lock contains a plurality of spring apertures 90 which has mounted in each aperture a valve spring 92. The valve springs are in engagement with the ring valve 78 to urge the ring valve into engagement with the valve surface 74.

Mounted and in engagement with the other side of the vent ring is a split vent ring lock 94 which is identical in construction to the vent ring lock 82. The vent ring lock 94 is mounted in a reduced proportion 96 of the rod 16. A vent ring lock collar 98 holds the split ring together and a set screw 100 holds the collar onto the vent ring lock. The split vent ring lock 94 contains a plurality of spring apertures 102 which has mounted therein valve springs 104. The valve springs 104 are in engagement with ring valve 80 to urge the valve into engagement with the valve surface 76 to control the flow of fluid in one direction through apertures 66.

Sealingly engageable with the vent ring 64 is an annular piston head 106. The piston head 106 has an annular interior conical surface 108 which sealingly engages the conical surface 70 of the vent ring. The piston has an outer peripheral conical surface 110 which faces in a direction opposite to the conical surface 108. At the other end of the piston head 106 there is a spring recess 112 which has a return spring 114 with one end in engagement with the piston head. The other end of spring 114 engages the tube head 28 so that the piston head is constantly urged toward the stop ring 62. The stop ring 62 has an interior conical surface 116, which mates with surface 110 of the piston head. The stop ring 62 has a second conical surface 118 which faces in a direction opposite to the surface 116. A second annular piston head 120 is mounted within the tube 22 between the stop ring 62 and head 30. The piston head 120 is identical in construction to piston head 106 and has an outer peripheral conical surface 122 which mates with surface 118 of the stop ring. The piston head 120 has an interior conical surface 124 which mates with outer peripheral conical surface 72 of the vent ring for sealing engagement therewith. The piston head 120 also has a spring recess 126 formed in one end and receives one end of a return spring 128. The return spring has its opposite end in engagement with head 30 so that the piston head 120 is constantly urged toward the stop ring 62.

The shock absorber 10 operates in the following manner. When an axial displacing force is applied to the cushion assembly one of the bumper rings is compressed. For purposes of illustration, it is assumed that an axial force in a direction from left to right as viewed in FIGURES 1 and 2 is applied to the cushion assembly 36. The initial impart of the force is taken up by the bumper ring 42. Inasmuch as the bumper ring is made of natural rubber the ring is compressed and the split load ring 38 is moved along the outer surface of tube 22 until the load ring comes into engagement with tube stop ring 48. The force then displaces the tube 22 relative to a portion of the piston assembly 14. As the tube 22 is moved toward the right, entire cylinder rides on surface 61 with the wheel assemblies 50. Inasmuch as the tube is moving and the rod 16 is stationary, it is apparent that the piston head 120 remains in engagement with stop ring 62 and there is no relative motion between the piston head 120 and the tube 22. However, the piston head 106 is in sealing engagement with the vent ring 64.

Inasmuch as the tube is moving relative to the rod, the head 28 moves toward the piston assembly. As the tube 22 moves relative to head 106 the space between the interior periphery of the tube and the exterior periphery of the piston head 106 defines a clearance through which must flow all hydraulic fluid which is contained between the piston head 106 and the head 28. This flow of fluid determines the resisting force of the shock absorber. It is apparent that as the force increases, a greater pressure is applied to the ring valve 78 so that the ring vent seals the vents 66. Inasmuch as the vent ring 64 is in sealing engagement with the rod 16 and with the piston head 106, at their respective mating conical surfaces, there is no leakage passed the piston head other than that through the clearance mentioned above. As the head 28 moves toward the piston head 106, the interior diameter of the tube becomes smaller and there is an increase in resistance to movement. The piston head 120 is carried away from the vent ring 64 by the stop ring 62. It is apparent that there is a high pressure developed between the piston 106 and the head 28, whereas the pressure on the side of the piston head 106 adjacent to head 30 remains normal. It is, also, readily apparent that as the head 28 moves toward the vent ring 64 return spring 114 is compressed to provide a means for returning the shock abserber to normal position.

It should be noted that the present construction is one in which the same amount of rod which enters the tube at one end also leaves the tube. Thus, there is no need for an accumulator and the likelihood of air becoming trapped in the shock absorber is clearly reduced.

Once the displacing force is removed, the shock absorber goes back to its normal position. The return spring 114 constantly urges the piston head 106 toward the stop ring 62. The return spring moves the entire tube to the left as viewed in FIGURES 1 and 2. It is apparent that as the head 28 is moved to the left, the stop ring 28 with the piston head 120 is also moved to the left so that the fluid contained between the two piston heads is on the high pressure side. Inasmuch as the head 28 is moving away from the piston head 106, the lowest pressure in the shock absorber is in the space between head 28 and the piston head 106. Thus, the fluid flows into the radial vents 68 and into the valve apertures 66 to displace ring valve 74 against the force of springs 92. The fluid then has an opportunity to have a free flow from the right side of the piston head 106 to the left side and the shock absorber may readily return to its normal position. It might be noted that there is some leakage on the return stroke between the piston head and the interior of the tube. However, that flow is negligible for purposes of returning the piston assembly to its normal position.

It is readily apparent that inasmuch as the construction of piston head 120 is identical to the construction of piston head 106, should the displacing force be from right to left, the operation of the shock absorber would be substantially identical, but the opposite parts would go into operation in the manner described above.

It should be noted that inasmuch as the piston heads 106 and 120 have opposed conical surfaces, these piston heads are always capable of tight engagement with the vent ring which has a pair of conical surfaces which mate with the conical surface of the piston heads. This particular construction allows for the piston heads to wear but the sealing surfaces are in no way damaged. Furthermore, the stop ring 62 also has conical surfaces engageable with the piston heads so that any wear which occurs between the piston heads and the stop rings does not affect the positioning of the piston assembly relative to the tube. This particular construction allows the present shock absorber to operate over prolonged periods of time with little or no maintenance. Furthermore, this particular construction of the piston assembly allows for a reduced cost in the construction of the shock absorber.

It is readily apparent that those skilled in the art may make various and sundry modifications and changes in the constructin of the herein disclosed device without departing from the spirit and scope of the present invention. It is to be expressly understood that the instant invention is limited only by the appended claims.

What is claimed is:

1. A double acting shock absorber comprising, in combination, an elongated cylindrical tube, a pair of tube heads sealing opposite ends of the tube, a rod slidably mounted in said heads and being axially moveable in said tube, a plurality of wheels mounted on said tube for supporting the tube and preventing rotation of said tube, a vent ring mounted on said rod, said vent ring having a plurality of vent apertures, valve means controlling flow of fluid through the vent apertures, said vent ring having a pair of outer peripheral conical surfaces facing in opposite directions, a pair of vent ring locks fixed to said rod for holding the vent ring axially relative to the rod, a pair of annular piston heads axially moveable in said tube, said tube including a clearance portion to allow a fluid to pass between the tube and the piston heads, each of said piston heads having an interior conical surface sealingly mateable with the outer peripheral conical surfaces of the vent ring, a return spring connected to each of said piston heads and acting against said tube urging the piston heads toward each other, each of said piston heads having an outer peripheral conical surface, a stop ring fixed to the interior surface of the tube, said stop ring having a pair of interior conical surfaces facing in opposite directions and engageable with the outer peripheral conical surfaces of the respective piston heads to limit the movement of the piston heads in one direction, whereby a displacing force moves the rod axially relative to the tube with the vent ring and one of the piston heads while the other of the piston heads remains in engagement with the stop ring forcing fluid contained between the displaced piston head and the adjacent tube head to flow between the outer periphery of the displaced piston head and the interior surface of the tube to control the movement of the rod relative to the tube, and release of the displacing force allows the return spring connected to the displaced piston head to urge the displaced piston head toward the stop ring and fluid contained between the piston heads flows through the vent ring to allow a free return of the displaced piston head.

2. A double acting shock absorber comprising, in combination, a stop ring fixed in the interior surface of said tube, said stop ring having a pair of interior conical surfaces extending in opposite directions, a pair of annular piston heads moveably mounted in said tube, said tube including a clearance portion to allow a fluid to pass between the tube and the piston heads, a return spring connected to each of said piston heads and acting against said tube urging the piston heads toward the stop ring, each of said piston heads having an outer peripheral conical surface engageable with the conical surface of the stop ring, a vent ring fixed to said rod and being sealingly engageable with the piston heads, said vent ring having a plurality of vent apertures, and valve means for controlling the flow of fluid through the vent apertures, whereby a displacing force moves the rod axially relative to the tube with the vent ring and one of the piston heads forcing fluid contained between the displaced piston head and the adjacent tube head to flow around the outer periphery of the displaced piston head to control the movement of the rod relative to the tube, and release of the force allows fluid between the two piston heads to flow through the vent apertures to allow a free return of the rod.

3. In a double acting shock absorber having a tube, a pair of tube heads sealing opposite ends of the tube, and a rod axially moveable in said tube and sealingly mounted in said heads, the improvement comprising, in combination, a vent ring fixed to said rod, said vent ring having a plurality of axial valve apertures, said vent ring having a radial vent aperture communicating with each of said valve apertures, a valve cooperative with each side of the vent ring to control the flow of fluid through the axial vent apertures, a pair of piston heads sealably engageable with the vent ring, said tube including a clearance portion to allow a fluid to pass between the tube and the piston heads, a return spring connected to each of the piston rings and acting against said tube for urging each of the rings to engage with the vent ring, and a stop ring mounted in the interior of the tube and engageable with each of the piston heads for limiting the movement of each of the heads in one direction, whereby displacement of the rod in one direction moves the vent ring and one of the piston heads from a normal position forcing fluid between the displaced piston head and the adjacent tube head to flow between the displaced piston head and the interior surface of the tube to control the movement of the rod, and release of a displacing force allows the return spring to urge the piston head and the vent ring toward a normal position and fluid between the two piston heads is compressed causing the fluid to flow through the radial apertures and into the vent apertures to displace the valve means in one direction.

4. In a double acting shock absorber having a tube, a pair of tube heads sealing opposite ends of the tube, a rod axially moveable in said tube and slidably mounted in said heads, the improvement comprising, in combination, a vent ring fixed to said rod, said vent ring having a plurality of axial valve apertures, said vent ring having a radial vent aperture communicating with each of said valve apertures, a valve cooperative with each side of the vent ring to control the flow of fluid through the axial vent apertures, said vent ring having a pair of outer peripheral conical surfaces and each surface facing an opposite direction, a pair of piston heads moveably mounted within said tube, each of said piston heads having an interior conical surface mateable with a respective outer peripheral conical surface of the vent ring, each of said piston heads having a diameter slightly less than the interior diameter of the tube to control the flow of a fluid between the interior surface of the tube and the exterior of the piston head, a return spring connected to each of the piston heads and acting against said tube for urging the piston heads into engagement with the vent ring, and a stop ring mounted in the interior of the tube and engageable with each of the piston heads for limiting the movement of each of the heads in one direction, whereby an axial displacing force moves the rod in one direction to move with the rod the vent ring and one of the piston rings from a normal position forcing fluid contained between the displaced piston head and the adjacent tube head to flow between the displaecd piston head and the interior surface of the tube to control the movement of the rod, and a release of the force allows the return spring connected to the displaced piston head to urge the piston head and the vent ring toward a normal position.

5. In a double acting shock absorber having an elongated tube, a pair of tube heads sealing opposite ends of the tube, a rod axially moveable in said tube and slideably mounted in said heads, the improvement comprising, in combination, a vent ring fixed on said rod, said vent ring having a plurality of axial valve apertures, said vent ring having a radial valve aperture connecting with each of said valve apertures, valve means connected to each of said valve apertures for controlling the flow of fluid therethrough, a pair of piston heads engageable with said vent ring, said tube including a clearance portion to allow a fluid to pass between the tube and the piston heads, each of said piston heads having an outer peripheral conical surface, a stop ring fixed in said tube, said stop ring having a pair of interior peripheral conical surfaces mateable with the outer peripheral conical surfaces of the piston heads, and a return spring connected to each of the piston heads and acting against said tube to urge the piston heads into engagement with the stop ring, whereby an axial displacing force moves the rod in one direction to move with it the vent ring and one of the piston heads from a normal position while the other of the piston heads remains in engagement with the stop ring forcing fluid contained between the displaced piston head and the adjacent tube head to flow between the displaced piston head and the interior surface of the tube to control the movement of the rod, and a release of the displacing force allows the return spring to urge the piston head with the vent ring and the rod toward a normal position and fluid between the two piston heads in compressed causing the fluid to flow through the radial vent apertures and into the vent apertures to allow a free return of the rod.

6. In a double acting shock absorber including a tube having opposite ends of said tube sealed by a pair of heads, a rod slideably mounted in said heads, said rod being axially moveable in said tube, the improvement comprising, in combination, a stop ring fixed in said tube, a first annular piston head engageable with said stop ring, a vent ring sealingly engageable with the annular piston head, a first vent ring lock fixed to said rod for holding the vent ring in one direction, a second vent ring lock fixed to said rod and holding the vent ring in the opposite direction, a second annular piston head engageable with the stop ring and the vent ring, a return spring connected to each of the piston heads and acting against said tube to urge said piston heads into engagement with the stop ring, said tube including a clearance portion to allow a fluid to pass between the tube and the piston heads, a ring valve mounted on each of the vent ring locks and being engageable with the respective vent ring to control the flow of a fluid through the respective vent ring, and means associated with said vent ring lock for urging each ring valve into engagement with the vent ring, whereby displacement of the rod relative to the tube in one direction displaces one of the annular piston heads out of engagement with the respective vent ring lock to regulate the movement of the rod relative to the tube by the flow of fluid between the annular piston head displaced relative to the tube and the interior surface of the tube, and when the displacing force is relieved, the annular piston head displaced relative to the tube with the vent ring is returned to a normal position and fluid between the other annular piston head which was not displaced and the displaced annular piston head is forced out through the vent ring to displace the respective ring valve to allow the fluid to flow.

7. In a double acting shock absorber having a tube, a pair of heads sealing opposite ends of the tube, and a rod sealingly mounted in the heads and being axially moveable in said tube, the improvement comprising, in combination, a stop ring fixed in said tube, a first annular piston head engageable with the stop ring to hold the head in one direction, a first return spring in engagement with the first piston head and acting against said tube urging the piston head toward the stop ring, a vent ring sealingly engageable with the piston ring, said vent ring having a plurality of valve apertures extending axially through the ring, said vent ring having a radial vent aperture communicating with each of the vent apertures, a first vent ring lock fixed to said rod for holding the vent ring in one direction, a second vent ring lock fixed to the rod and in engagement with the vent ring holding the vent ring in the opposite direction, a ring valve mounted on each of the vent ring locks and engageable with respective sides of the vent ring to control the flow of fluid through the vent apertures, means associated with each of the vent ring locks for urging the respective valve ring into engagement with the vent ring, a second annular piston head sealingly engageable with the vent ring and engageable with the stop ring, said tube including a clearance portion to allow a fluid to pass between the tube and the piston heads, and a second return spring in engagement with the second piston head and acting against said tube urging the second piston head into sealing engagement with the vent ring and toward the stop ring, whereby displacement of the rod axially relative to the tube moves one of the piston heads out of engagement with the stop ring and movement of the rod places the vent ring into a sealing engagement with the displaced piston head causing fluid to flow between the outer peripheral surface of the piston head and the interior surface of the tube to control the movement of the rod relative to the tube, and release of a displacing force allows one of the return springs to urge its respective displaced piston head to engage the vent ring and return the vent ring to a normal position forcing fluid trapped between the two piston heads to flow into the radial apertures and the pressure of the fluid displaces the valve ring on the low pressure side against the means urging the valve ring into engagement with the vent ring to allow free flow of fluid.

8. In a double acting shock absorber having an elongated tube, a pair of tube heads sealing opposite ends of the tube, a rod axially moveable in said tube and slideably mounted in said heads, the improvement comprising, in combination, a vent ring fixed to said rod, said vent ring having a plurality of vent apertures contained therein, means controlling the flow of fluid through the vent apertures, said vent ring having a pair of outer peripheral conical surfaces facing in opposite directions, a pair of piston heads moveably mounted within said tube, said tube including a clearance portion to allow a fluid to pass between the tube and the piston heads, each of said piston heads having an interior conical surface sealingly mateable with an outer peripheral conical surface of the vent ring, a return spring connected to each of said pistons heads and acting against said tube urging the piston heads toward each other, and a stop ring fixed in the tube and engageable with the piston heads to limit the movement of each of the piston heads in an opposite direction, whereby a displacing force moves the rod axially relative to the tube with the vent ring and one of the piston heads while the other piston head remains in engagement with the stop ring and fluid contained between the displaced piston head and the respective head flows between the outer periphery of the displaced piston head and the interior surface of the tube to control the movement of the rod relative to the tube, and release of the force allows fluid between the two piston heads to flow freely through the vent ring and the return spring urges the displaced piston head toward the stop ring.

9. In a double acting shock absorber having an elongated tube, a pair of tube heads sealing opposite ends of the tube, a rod axially moveable in said tube and slideably mounted in said heads, the improvement comprising, in combination, a stop ring fixed in said tube, said stop ring having a pair of interior peripheral conical surfaces, each of said surfaces facing in an opposite direction, a pair of piston heads moveably mounted in said tube, said tube including a clearance portion to allow a fluid to pass between the tube and the piston heads, each of said piston heads having an outer peripheral conical surface mateable with the interior peripheral conical surface of the stop ring, a return spring connected to each of the said piston heads and acting against said tube to urge each of said piston heads into engagement with the stop ring, each of said piston heads having an interior conical surface facing in a direction away from the outer peripheral conical surface of the piston head, a vent ring fixed to said rod, said vent ring having a pair of outer peripheral conical surfaces extending in opposite directions and mateable with the interior conical surface of a respective piston head to form a seal between the piston head and the vent ring when the piston head and vent ring are in tight engagement, said vent ring having a plurality of axial vent apertures and a radial aperture communicating with each of the vent apertures, and valve means for controlling the flow of fluid through the valve apertures, whereby a displacing force axially displaced the rod in one direction and moves with the rod the vent ring and one of the piston heads from a normal position forcing fluid between the displaced piston head and the adjacent tube head to flow between the displaced piston head and the interior surface of the tube to control the movement of the rod, and release of the displacing force allows the respective return spring to urge the displaced piston head toward the stop ring, and fluid between the two piston heads is compressed thereby causing the fluid to flow through the radial apertures and into the vent apertures to allow free return of the rod to a normal position.

10. A double acting shock absorber comprising, in combination, an elongated cylindrical tube, a pair of tube heads sealingly mounted on opposite ends of the tube, a rod sealingly mounted in the heads and being axially moveable in said tube, a plurality of wheels connected to said tube and being adapted for engagement with a flat surface for rolling thereon and supporting said tube, a stop ring fixed in said tube, a first piston head engageable with the stop ring, a first return spring connected to the first piston head and acting against said tube urging the piston head toward the stop ring, a second piston head engageable with the opposite side of the stop ring, said tube including a clearance portion to allow a fluid to pass between the tube and the piston heads, a second return spring connected to the second piston head and acting against said tube urging the second piston head toward the stop ring, a vent ring fixed to the rod and being sealingly engageable with the piston heads, said vent ring having a plurality of valve apertures extending axially through the ring and a radial valve aperture communicating with each of the valve apertures, a pair of ring valves engageable with opposite ends of the vent ring for controlling flow of fluid through the valve apertures, and means associated with each of the ring valves for resiliently holding the ring valves in engagement with the vent ring, whereby a displacing force moves the rod axially relative to the tube with the vent ring and displaces one of the piston heads so that fluid between the displaced piston head and the respective tube head flows between the outer periphery of the displaced piston head and the interior surface of the tube to control movement of the rod, and release of the displacing force allows the return spring connected to the displaced piston head to urge the displaced piston head toward the stop ring and fluid between the two piston heads is compressed thereby forcing the fluid to flow into the radial apertures and displace the respective ring valve and flow into the space between the displaced piston head and the respective head to allow a free return of the rod.

11. In a double acting shock absorber having an elongated tube, a pair of tube heads sealing opposite ends of the tube, a rod axially moveable in said tube and slideably mounted in said heads, the improvement comprising, in combination, a stop ring fixed in the interior surface of the tube, said stop ring having a pair of interior conical surfaces facing in opposite directions, a pair of annular piston heads moveably mounted in said tube, said tube including a clearance portion to allow a fluid to pass between the tube and the piston heads, each of said annular piston heads having an outer peripheral conical surface mateable with one of the interior conical surfaces of the stop ring, a return spring connected to each of the piston heads and acting against said tube to urge the piston heads into tight engagement with the stop ring, a vent ring mounted on said rod, said vent ring having a pair of outer peripheral conical surfaces extending in opposite directions and said outer peripheral conical surfaces being mateable with the interior conical surfaces of the piston heads for sealing engagement therebetween, said vent ring having a plurality of axial vent apertures and a radial aperture communicating with each of the vent apertures, a first split vent ring lock fixed to said rod and in engagement with the vent ring to hold the vent ring in one direction, a ring lock collar connected to the split vent ring lock holding the vent ring lock together and in position on the rod, a second split vent ring lock mounted on the rod and in engagement with the vent ring to hold the movement of the vent ring in the opposite direction, a second ring lock collar mounted on the second vent ring lock to hold the vent ring lock together and fixedly connected to the rod, and a ring valve mounted on each of the vent ring locks and cooperative with opposite sides of the vent ring to control the flow of fluid through the vent apertures, whereby a displacing force moves the rod in an axial direction relative to the tube to move one of the piston heads toward its respective head against the force of its respective return spring and fluid contained between the displaced piston head and the adjacent tube head flows between the outer peripheral surface of the piston head and the interior surface of the tube to control the movement of the rod relative to the tube, and a release of the displacing force allows the respective return spring to urge the displaced piston head toward the stop ring so that fluid contained between the piston heads is forced into the radial apertures to displace the valve ring on the side adjacent to the displaced piston head to allow a free return of the rod.

References Cited in the file of this patent
UNITED STATES PATENTS

| | | |
|---|---|---|
| 2,402,400 | Hewitt et al. | June 18, 1946 |
| 2,637,414 | Patriquin | May 5, 1953 |
| 2,992,815 | Ellis | July 18, 1961 |

UNITED STATES PATENT OFFICE
CERTIFICATE OF CORRECTION

May 5, 1964

Patent No. 3,131,921

Stanley Karbowniczek

It is hereby certified that error appears in the above numbered patent requiring correction and that the said Letters Patent should read as corrected below.

Column 2, line 9, for "stop" read -- load --; column 4, line 14, for "28" read -- 62 --; line 21, for "74" read -- 78 --; column 8, line 54, for "displaced" read -- displaces --.

Signed and sealed this 29th day of September 1964.

(SEAL)
Attest:

ERNEST W. SWIDER
Attesting Officer

EDWARD J. BRENNER
Commissioner of Patents